US012748555B2

(12) United States Patent
Roberts

(10) Patent No.: US 12,748,555 B2
(45) Date of Patent: Sep. 29, 2026

(54) MODIFYING MACHINE LEARNING PARAMETERS IN MEMORY SYSTEMS

(71) Applicant: Micron Technology, Inc., Boise, ID (US)

(72) Inventor: David A. Roberts, Wellesley, MA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/784,231

(22) Filed: Jul. 25, 2024

(65) Prior Publication Data

US 2026/0029953 A1 Jan. 29, 2026

(51) Int. Cl.
*G06F 3/06* (2006.01)

(52) U.S. Cl.
CPC .......... *G06F 3/0659* (2013.01); *G06F 3/0604* (2013.01); *G06F 3/0673* (2013.01)

(58) Field of Classification Search
CPC .... G06F 3/0659; G06F 3/0604; G06F 3/0673; G06F 13/1668; G06F 3/0679; G06F 3/061; G06F 3/0611; G06F 3/0613; G06F 3/0655; G06F 3/0683; G06F 3/0688; G06F 3/0661; G06F 3/0658
See application file for complete search history.

(56) References Cited

U.S. PATENT DOCUMENTS

| | | | | |
|---|---|---|---|---|
| 2021/0279574 | A1* | 9/2021 | Liu | G06N 3/0464 |
| 2023/0046535 | A1* | 2/2023 | Cariello | G06F 3/0655 |
| 2023/0168921 | A1* | 6/2023 | Kim | G06F 15/80 712/220 |
| 2024/0281383 | A1* | 8/2024 | Tiwari | G06F 3/0659 |
| 2024/0319871 | A1* | 9/2024 | Kim | G06F 3/0673 |
| 2025/0006232 | A1* | 1/2025 | Papadopoulos | G11C 11/54 |
| 2025/0036284 | A1* | 1/2025 | Roberts | G06F 3/0673 |
| 2025/0117661 | A1* | 4/2025 | Shao | G06N 3/084 |
| 2025/0332725 | A1* | 10/2025 | Hari | B25J 9/161 |

OTHER PUBLICATIONS

Shuming Ma, "The Era of 1-bit LLMs: All Large Language Models are in 1.58Bits.", https://arxiv.org/abs/2402.17764, Feb. 27, 2024, 8 pages.

* cited by examiner

*Primary Examiner* — Tracy A Warren
(74) *Attorney, Agent, or Firm* — Harrity & Harrity, LLP

(57) ABSTRACT

In some implementations, a memory apparatus may obtain, from one or more host systems, a first command indicating that one or more first parameters associated with a full precision dataset are to be modi1fied from a first format to a second format. The memory apparatus may obtain a second command indicating that the one or more first parameters are to be modified from the first format to a third format. The memory apparatus may generate one or more second parameters associated with the full precision dataset, the one or more second parameters having the second format. The memory apparatus may generate one or more third parameters associated with the full precision dataset, the one or more second parameters having the third format. The memory apparatus may store the one or more second parameters and the one or more third parameters.

34 Claims, 7 Drawing Sheets

300

MODIFYING MACHINE LEARNING PARAMETERS IN MEMORY SYSTEMS

GOVERNMENT LICENSE RIGHTS

This invention was made with Government support under Contract DE-AC05-76RL01830 awarded by the U.S. Department of Energy. The Government has certain rights in the invention.

TECHNICAL FIELD

The present disclosure generally relates to memory devices, memory device operations, and, for example, to modifying machine learning parameters in memory systems.

BACKGROUND

Memory devices are widely used to store information in various electronic devices. A memory device includes memory cells. A memory cell is an electronic circuit capable of being programmed to a data state of two or more data states. For example, a memory cell may be programmed to a data state that represents a single binary value, often denoted by a binary "1" or a binary "0." As another example, a memory cell may be programmed to a data state that represents a fractional value (e.g., 0.5, 1.5, or the like). To store information, an electronic device may write to, or program, a set of memory cells. To access the stored information, the electronic device may read, or sense, the stored state from the set of memory cells.

Various types of memory devices exist, including random access memory (RAM), read only memory (ROM), dynamic RAM (DRAM), static RAM (SRAM), synchronous dynamic RAM (SDRAM), ferroelectric RAM (FeRAM), magnetic RAM (MRAM), resistive RAM (RRAM), holographic RAM (HRAM), flash memory (e.g., NAND memory and NOR memory), and others. A memory device may be volatile or non-volatile. Non-volatile memory (e.g., flash memory) can store data for extended periods of time even in the absence of an external power source. Volatile memory (e.g., DRAM) may lose stored data over time unless the volatile memory is refreshed by a power source.

DETAILED DESCRIPTION

Figure 1:
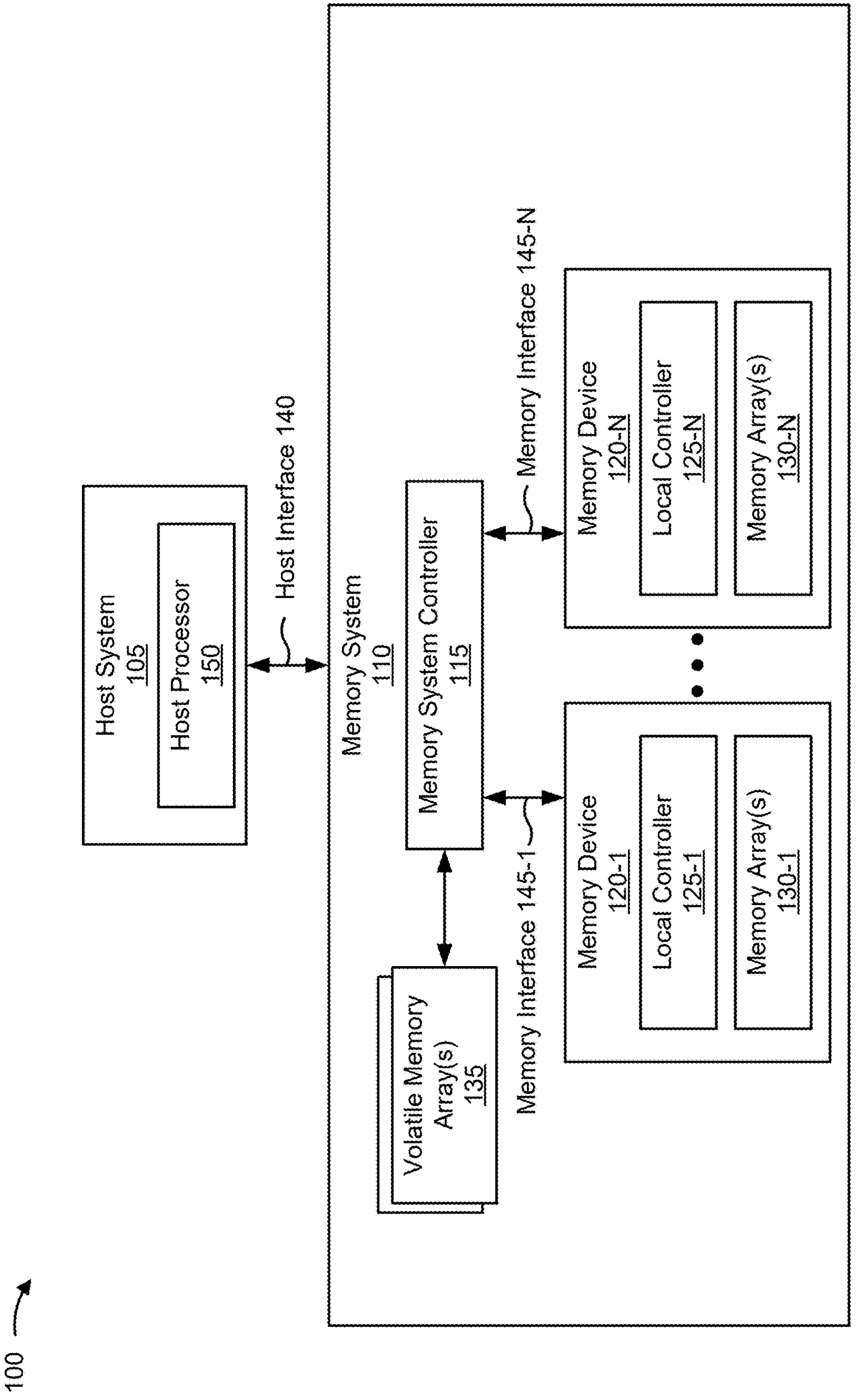
FIG. 1 is a diagram illustrating an example system capable of modifying machine learning parameters in memory systems.

Some computing systems, such as computing systems that operate according to a compute express link (CXL) protocol, may implement a full precision dataset of machine learning model to process one or more queries using a set of parameters associated with the machine learning model. For example, to process a query using a neural network (e.g., a multi-layer perceptron, a convolutional neural network, and/or a recurrent neural network, among other examples), a computing system may access parameters corresponding to one or more layers of the neural network and apply the parameters to the query. For example, the parameters may include weights and/or biases of the neural network. In some cases, a computing system may quantize one or more of the parameters. As described herein, "quantizing" a parameter refers to modifying the format of the parameter from a higher precision to a lower precision. For example, quantizing a parameter may include applying one or more quantization functions to the parameter to modify the parameter from a first format associated with a first size (e.g., a first quantity of bits) to a second format associated with a second size (e.g., a second quantity of bits) that is less than the first quantity of bits. Such formats may include a double float format (e.g., associated with 64 bits), a single float format (e.g., associated with 32 bits), a brain floating point format (e.g., associated with 16 bits), integer formats (e.g., an integer 8 format (int8) associated with 8 bits, an integer 4 (int4) format associated with 4 bits), and/or ternary encodings (e.g., associated with 1.58 bits), among other examples.

By quantizing parameters associated with a machine learning model, the computing system may improve performance of the machine learning model, such as by reducing bandwidth associated with communicating the quantized parameters between components of the computing system, reducing memory used to store the quantized parameters, and/or reducing computation used to process the quantized parameters, among other examples. In some examples, the computing system may include one or more host systems, such as one or more processing units (e.g., central processing units (CPUs), graphics processing units (GPUs), neural processing units (NPUs), or other processing units) and/or accelerators that may execute the machine learning model. However, because of the size of machine learning models, quantizing such parameters may use relatively large memory resources. Accordingly, quantizing parameters at the host system(s) may consume significant resources, such as compute time and/or on-board (e.g., local) memory of the host system(s) (e.g., on-board caches, high-bandwidth memory).

Some implementations described herein enable modifying learning parameters in a memory system. For example, one or more host systems may generate one or more base parameters having a first format (e.g., one or more first parameters) of the machine learning model. In some examples, the base parameter(s) may be examples of neural network parameter(s), and may correspond to one or more layers of the neural network. The base parameters may be non-quantized, and may be referred to as or included in a full precision dataset of the machine learning model. The host system(s) may store the base parameter(s) to the memory system.

As part of training and/or post training associated with the machine learning model, the host system(s) may determine to modify (e.g., quantize) the base parameter(s). For example, the host system(s) may provide, and the memory system may obtain, a quantization command indicating a second format to which the base parameter(s) are to be modified. Based on, in response to, or otherwise associated with obtaining the quantization command, the memory system may apply one or more quantization functions to the base parameter(s) to generate one or more modified parameters having the second format. The memory system may provide, and the host system(s) may obtain, the modified parameter(s).

In some examples, the host system(s) may indicate that the memory system(s) are to store multiple copies of the base parameter(s). In such examples, the memory system may store a respective copy of the base parameter(s) to multiple memory subsystems. Such memory subsystems may quantize respective copies of the base parameter(s) without retrieving the base parameter(s) from a separate memory subsystem.

In such implementations, the memory system may prioritize quantizing the base parameter(s) to a given format. For example, if the memory system obtains a first quantization command and subsequently receives a second quantization command, then the memory system may prioritize performing the first quantization command before performing the second quantization command. Alternatively, the memory system may prioritize quantization command(s) based on a priority metric indicated by the quantization commands. For example, the memory system may obtain a first quantization command indicating a first priority metric and a second quantization command indicating a second priority metric. If the first priority metric and the second priority metric indicate that the first quantization command is of a higher priority than the second quantization command, then the memory system may prioritize performing the first quantization command before performing the second quantization command.

As a result, by modifying machine learning parameters at a memory system as described herein, the memory system may improve efficiency of processing parameters associated with a machine learning model. For example, because the memory system may apply the quantization functions, rather than the host system(s), processing load on the host system(s) may be reduced, which may allow, or improve the ability of, the host system(s) to perform other tasks. Additionally, by storing multiple copies of the base parameter(s) to the memory system, the memory system may reduce bandwidth associated with communications between memory subsystems (e.g., inter-module communication), and thus improve system performance. Further, by prioritizing the quantization commands, the memory system may perform the quantization commands while satisfying the requested latency of the quantization commands. Accordingly, the memory system may generate multiple formats (e.g., multiple versions) of the base parameter(s) in the order indicated by the host system(s), which may improve the ability of the host system(s) to efficiently schedule quantization operations.

FIG. 1 is a diagram illustrating an example system 100 capable of modifying machine learning parameters in memory systems. The system 100 may include one or more devices, apparatuses, and/or components for performing operations described herein. For example, the system 100 may include a host system 105 and a memory system 110. The memory system 110 may include a memory system controller 115 and one or more memory devices 120, shown as memory devices 120-1 through 120-N (where N≥1). A memory device may include a local controller 125 and one or more memory arrays 130. The host system 105 may communicate with the memory system 110 (e.g., the memory system controller 115 of the memory system 110) via a host interface 140. The memory system controller 115 and the memory devices 120 may communicate via respective memory interfaces 145, shown as memory interfaces 145-1 through 145-N (where N≥1).

The system 100 may be any electronic device configured to store data in memory. For example, the system 100 may be a computer, a mobile phone, a wired or wireless communication device, a network device, a server, a device in a data center, a device in a cloud computing environment, a vehicle (e.g., an automobile or an airplane), and/or an Internet of Things (IoT) device. The host system 105 may include a host processor 150. The host processor 150 may include one or more processors configured to execute instructions and store data in the memory system 110. For example, the host processor 150 may include a CPU, a GPU, a field-programmable gate array (FPGA), an application-specific integrated circuit (ASIC), and/or another type of processing component.

The memory system 110 may be any electronic device or apparatus configured to store data in memory. For example, the memory system 110 may be a hard drive, a solid-state drive (SSD), a flash memory system (e.g., a NAND flash memory system or a NOR flash memory system), a universal serial bus (USB) drive, a memory card (e.g., a secure digital (SD) card), a secondary storage device, a non-volatile memory express (NVMe) device, an embedded multimedia card (eMMC) device, a dual in-line memory module (DIMM), and/or a random-access memory (RAM) device, such as a dynamic RAM (DRAM) device or a static RAM (SRAM) device.

The memory system controller 115 may be any device configured to control operations of the memory system 110 and/or operations of the memory devices 120. For example, the memory system controller 115 may include control logic, a memory controller, a system controller, an ASIC, an FPGA, a processor, a microcontroller, and/or one or more processing components. In some implementations, the memory system controller 115 may communicate with the host system 105 and may instruct one or more memory devices 120 regarding memory operations to be performed by those one or more memory devices 120 based on one or more instructions from the host system 105. For example, the memory system controller 115 may provide instructions to a local controller 125 regarding memory operations to be performed by the local controller 125 in connection with a corresponding memory device 120.

A memory device 120 may include a local controller 125 and one or more memory arrays 130. In some implementations, a memory device 120 includes a single memory array 130. In some implementations, each memory device 120 of the memory system 110 may be implemented in a separate semiconductor package or on a separate die that includes a respective local controller 125 and a respective memory array 130 of that memory device 120. The memory system 110 may include multiple memory devices 120.

A local controller 125 may be any device configured to control memory operations of a memory device 120 within which the local controller 125 is included (e.g., and not to control memory operations of other memory devices 120). For example, the local controller 125 may include control logic, a memory controller, a system controller, an ASIC, an FPGA, a processor, a microcontroller, and/or one or more processing components. In some implementations, the local controller 125 may communicate with the memory system controller 115 and may control operations performed on a memory array 130 coupled with the local controller 125 based on one or more instructions from the memory system controller 115. As an example, the memory system controller 115 may be an SSD controller, and the local controller 125 may be a NAND controller.

A memory array 130 may include an array of memory cells configured to store data. For example, a memory array 130 may include a non-volatile memory array (e.g., a NAND memory array or a NOR memory array) or a volatile memory array (e.g., an SRAM array or a DRAM array). In some implementations, the memory system 110 may include one or more volatile memory arrays 135. A volatile memory array 135 may include an SRAM array and/or a DRAM array, among other examples. The one or more volatile memory arrays 135 may be included in the memory system controller 115, in one or more memory devices 120, and/or in both the memory system controller 115 and one or more memory devices 120. In some implementations, the memory system 110 may include both non-volatile memory capable of maintaining stored data after the memory system 110 is powered off and volatile memory (e.g., a volatile memory array 135) that requires power to maintain stored data and that loses stored data after the memory system 110 is powered off. For example, a volatile memory array 135 may cache data read from or to be written to non-volatile memory, and/or may cache instructions to be executed by a controller of the memory system 110.

The host interface 140 enables communication between the host system 105 (e.g., the host processor 150) and the memory system 110 (e.g., the memory system controller 115). The host interface 140 may include, for example, a Small Computer System Interface (SCSI), a Serial-Attached SCSI (SAS), a Serial Advanced Technology Attachment (SATA) interface, a Peripheral Component Interconnect Express (PCIe) interface, an NVMe interface, a USB interface, a Universal Flash Storage (UFS) interface, an eMMC interface, a double data rate (DDR) interface, a DIMM interface, and/or a CXL interface (e.g., a PCIe/CXL interface, described in more detail below).

The memory interface 145 enables communication between the memory system 110 and the memory device 120. The memory interface 145 may include a non-volatile memory interface (e.g., for communicating with non-volatile memory), such as a NAND interface or a NOR interface. Additionally, or alternatively, the memory interface 145 may include a volatile memory interface (e.g., for communicating with volatile memory), such as a DDR interface.

In some examples, the memory system 110 may be a CXL compliant memory system (sometimes referred to herein as a CXL memory system, a CXL memory device, a CXL memory module, a CXL device, and/or a similar term). CXL is a high-speed CPU-to-device and CPU-to-memory interconnect designed to accelerate next-generation performance. CXL technology maintains memory coherency between the CPU memory space and memory on attached devices, which allows resource sharing for higher performance, reduced software stack complexity, and lower overall system cost. CXL is designed to be an industry open standard interface for high-speed communications. CXL technology is built on the PCIe infrastructure, leveraging PCIe physical and electrical interfaces to provide an advanced protocol in areas such as input/output (I/O) protocol, memory protocol, and coherency interface.

In some examples, such as in examples in which the memory system 110 is a CXL device, the memory system 110 may include a PCIe/CXL interface (e.g., the host interface 140 may be associated with a PCIe/CXL interface), which may be a physical interface configured to connect the CXL memory system and/or the CXL memory device to CXL compliant host devices. In such examples, the PCIe/CXL interface may comply with CXL standard specifications for physical connectivity, ensuring broad compatibility and case of integration into existing systems using the CXL protocol. Additionally, or alternatively, a CXL memory system and/or a CXL memory device may be designed to efficiently interface with computing systems (e.g., the host system 105) by leveraging the CXL protocol. For example, a CXL memory system and/or a CXL memory device may be configured to utilize high-speed, low-latency interconnect capabilities of CXL, such as for a purpose of making the CXL memory system and/or the CXL memory device suitable for high-performance computing, data center applications, artificial intelligence (AI) applications, and/or similar applications.

A CXL memory system and/or a CXL memory device may include a CXL memory controller (e.g., memory system controller 115 and/or local controller 125), which may be configured to manage data flow between memory arrays (e.g., volatile memory arrays 135 and/or memory arrays 130) and a CXL interface (e.g., a PCIe/CXL interface, such as host interface 140). In some examples, the CXL memory controller may be configured to handle one or more CXL protocol layers, such as an I/O layer (e.g., a layer associated with a CXL.io protocol, which may be used for purposes such as device discovery, configuration, initialization, I/O virtualization, direct memory access (DMA) using non-coherent load-store semantics, and/or similar purposes); a cache coherency layer (e.g., a layer associated with a CXL.cache protocol, which may be used for purposes such as caching host memory using a modified, exclusive, shared, invalid (MESI) coherence protocol, or similar purposes); or a memory protocol layer (e.g., a layer associated with a CXL.memory (sometimes referred to as CXL.mem) protocol, which may enable a CXL memory device to expose host-managed device memory (HDM) to permit a host device to manage and access memory similar to a native DDR connected to the host); among other examples.

A CXL memory system and/or a CXL memory device may further include and/or be associated with one or more high-bandwidth memory modules (HBMMs) or similar memory arrays (e.g., volatile memory arrays 135 and/or memory arrays 130). For example, a CXL memory system and/or a CXL memory device may include multiple layers of DRAM (e.g., stacked and/or interconnected through advanced through-silicon via (TSV) technology) in order to maximize storage density and/or enhance data transfer speeds between memory layers. Additionally, or alternatively, a CXL memory system and/or a CXL memory device may include a power management unit, which may be configured to regulate power consumption associated with the CXL memory system and/or the CXL memory device and/or which may be configured to improve energy efficiency for the CXL memory system and/or the CXL memory device. Additionally, or alternatively, a CXL memory system and/or a CXL memory device may include additional components, such as one or more error correction code (ECC) engines, such as for a purpose of detecting and/or correcting data errors to ensure data integrity and/or improve the overall reliability of the CXL memory system and/or the CXL memory device.

Although the example memory system 110 described above includes a memory system controller 115, in some implementations, the memory system 110 does not include a memory system controller 115. For example, an external controller (e.g., included in the host system 105) and/or one or more local controllers 125 included in one or more corresponding memory devices 120 may perform the operations described herein as being performed by the memory system controller 115. Furthermore, as used herein, a "controller" may refer to the memory system controller 115, a local controller 125, or an external controller. In some implementations, a set of operations described herein as being performed by a controller may be performed by a single controller. For example, the entire set of operations may be performed by a single memory system controller 115, a single local controller 125, or a single external controller. Alternatively, a set of operations described herein as being performed by a controller may be performed by more than one controller. For example, a first subset of the operations may be performed by the memory system controller 115 and a second subset of the operations may be performed by a local controller 125. Furthermore, the term "memory apparatus" may refer to the memory system 110 or a memory device 120, depending on the context.

A controller (e.g., the memory system controller 115, a local controller 125, or an external controller) may control operations performed on memory (e.g., a memory array 130), such as by executing one or more instructions. For example, the memory system 110 and/or a memory device 120 may store one or more instructions in memory as firmware, and the controller may execute those one or more instructions. Additionally, or alternatively, the controller may receive one or more instructions from the host system 105 and/or from the memory system controller 115, and may execute those one or more instructions. In some implementations, a non-transitory computer-readable medium (e.g., volatile memory and/or non-volatile memory) may store a set of instructions (e.g., one or more instructions or code) for execution by the controller. The controller may execute the set of instructions to perform one or more operations or methods described herein. In some implementations, execution of the set of instructions, by the controller, causes the controller, the memory system 110, and/or a memory device 120 to perform one or more operations or methods described herein. In some implementations, hardwired circuitry is used instead of or in combination with the one or more instructions to perform one or more operations or methods described herein. Additionally, or alternatively, the controller may be configured to perform one or more operations or methods described herein. An instruction is sometimes called a "command."

For example, the controller (e.g., the memory system controller 115, a local controller 125, or an external controller) may transmit signals to and/or receive signals from memory (e.g., one or more memory arrays 130) based on the one or more instructions, such as to transfer data to (e.g., write or program), to transfer data from (e.g., read), to erase, and/or to refresh all or a portion of the memory (e.g., one or more memory cells, pages, sub-blocks, blocks, or planes of the memory). Additionally, or alternatively, the controller may be configured to control access to the memory and/or to provide a translation layer between the host system 105 and the memory (e.g., for mapping logical addresses to physical addresses of a memory array 130). In some implementations, the controller may translate a host interface command (e.g., a command received from the host system 105) into a memory interface command (e.g., a command for performing an operation on a memory array 130).

In some implementations, one or more systems, devices, apparatuses, components, and/or controllers of FIG. 1 may be configured to: obtain, from one or more host systems, a command indicating that one or more first parameters associated with a full precision dataset are to be modified, the command indicating one or more source addresses and one or more destination addresses; obtain, based on obtaining the command, the one or more first parameters from the one or more source addresses, the one or more first parameters having a first format; generate, based on the one or more first parameters, one or more second parameters associated with the full precision dataset, the one or more second parameters having a second format; and store the one or more second parameters to the one or more destination addresses.

In some implementations, one or more systems, devices, apparatuses, components, and/or controllers of FIG. 1 may be configured to: provide, to a memory apparatus, a first command indicating that the memory apparatus is to modify one or more first parameters associated with a full precision dataset, the one or more first parameters having a first format and the first command indicating one or more source addresses and one or more destination addresses; obtain, from the memory apparatus and based on providing the first command, one or more second parameters associated with the full precision dataset, the one or more second parameters having a second format; generate one or more third parameters associated with the full precision dataset based on executing the full precision dataset using the one or more second parameters; and provide, to the memory apparatus and based on generating the one or more third parameters, a second command indicating that the one or more third parameters are to be stored to the memory apparatus.

In some implementations, one or more systems, devices, apparatuses, components, and/or controllers of FIG. 1 may be configured to communicate, via the host interface and to the memory apparatus, a first command indicating that one or more first parameters associated with a full precision dataset are to be modified, the one or more first parameters having a first format and the first command indicating one or more source addresses and one or more destination addresses; communicate, via the host interface and to the host system and based on communicating the first command, one or more second parameters associated with the full precision dataset, the one or more second parameters having a second format; and communicate, via the host interface and to the memory apparatus, a second command indicating that one or more third parameters are to be stored to the memory apparatus, the one or more third parameters based on executing the full precision dataset using the one or more second parameters.

In some implementations, one or more systems, devices, apparatuses, components, and/or controllers of FIG. 1 may be configured to obtain, from one or more host systems, a first command indicating that one or more first parameters associated with a full precision dataset are to be modified from a first format to a second format; obtain, from the one or more host systems, a second command indicating that the one or more first parameters are to be modified from the first format to a third format; generate, based on the one or more first parameters, one or more second parameters associated with the full precision dataset, the one or more second parameters having the second format; generate, based on the one or more first parameters, one or more third parameters associated with the full precision dataset, the one or more second parameters having the third format; and store the one or more second parameters and the one or more third parameters.

In some implementations, one or more systems, devices, apparatuses, components, and/or controllers of FIG. 1 may be configured to provide, to a memory apparatus, a first command indicating that one or more first parameters associated with a full precision dataset are to be modified, the one or more first parameters having a first format and the first command indicating one or more source addresses and one or more destination addresses; obtain, from the memory apparatus and based on providing the first command, one or more second parameters associated with the full precision dataset, the one or more second parameters having a second format; generate one or more third parameters associated with the full precision dataset based on executing the full precision dataset using the one or more second parameters; and provide, to the memory apparatus and based on generating the one or more third parameters, a second command indicating that the one or more third parameters are to be stored to the memory apparatus.

The number and arrangement of components shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Additionally, or alternatively, a set of components (e.g., one or more components) shown in FIG. 1 may perform one or more operations described as being performed by another set of components shown in FIG. 1.

Figure 2:
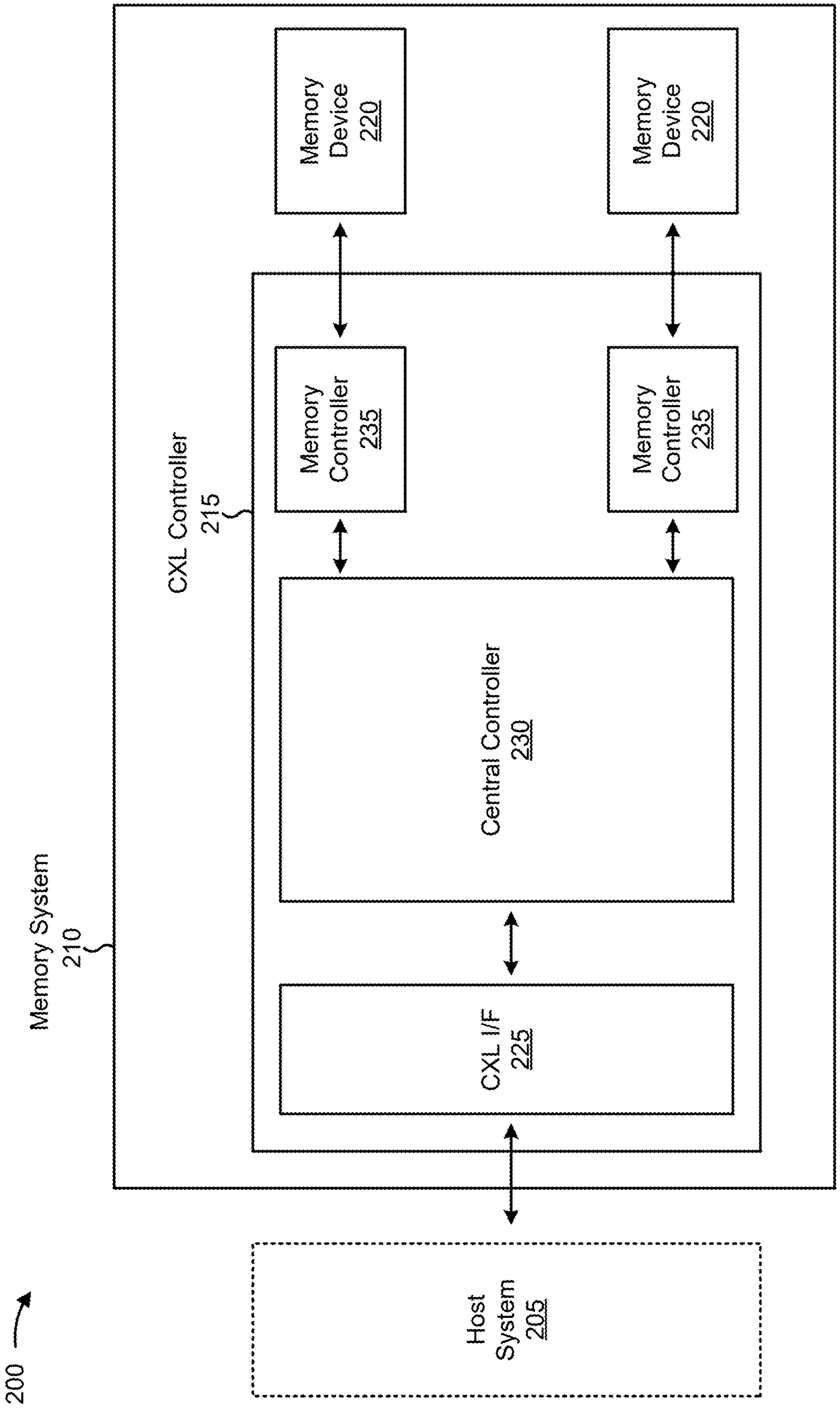
FIG. 2 is a diagram illustrating an example system that supports modifying machine learning parameters in memory systems.

FIG. 2 is a diagram illustrating an example system 200 that supports modifying machine learning parameters in memory systems. The system 200 may include one or more devices, apparatuses, and/or components for performing operations described herein. In some implementations, the system 200 may be a CXL system. For example, the system 200 may include a host system 205. The system 200 may further include a memory system 210, which may be referred to as a memory module, that includes a memory module controller, such as a CXL controller 215, and one or more memory devices 220. FIG. 2 shows two memory devices 220 as an example. In other examples, the memory system 210 may include a different quantity of memory devices 220. The memory system 210 may be an example of the memory system 110. The host system 205 may include one or more processors, such as CPUs, GPUs, accelerators, and/or other processing circuitry. In some implementations, the host system 205 may be an example of, or may include aspects of, the host system 105 and/or the host processor 150. The memory device(s) 220 may include volatile memory. In some implementations, the memory device(s) 220 may include DRAM. In some implementations, the memory device(s) 220 may be examples of the memory device(s) 120.

The CXL controller 215 may include an ASIC and/or an FPGA, among other examples. The CXL controller 215 may include a memory subsystem interface, such as a CXL interface 225 (shown as CXL I/F in FIG. 2), a central controller 230, and one or more memory controllers 235. In some implementations, the CXL interface 225 may be an example of, or may include aspects of, the host interface 140. In some implementations, the memory controller(s) 235 may be examples of the memory system controller 115.

Figure 3A:
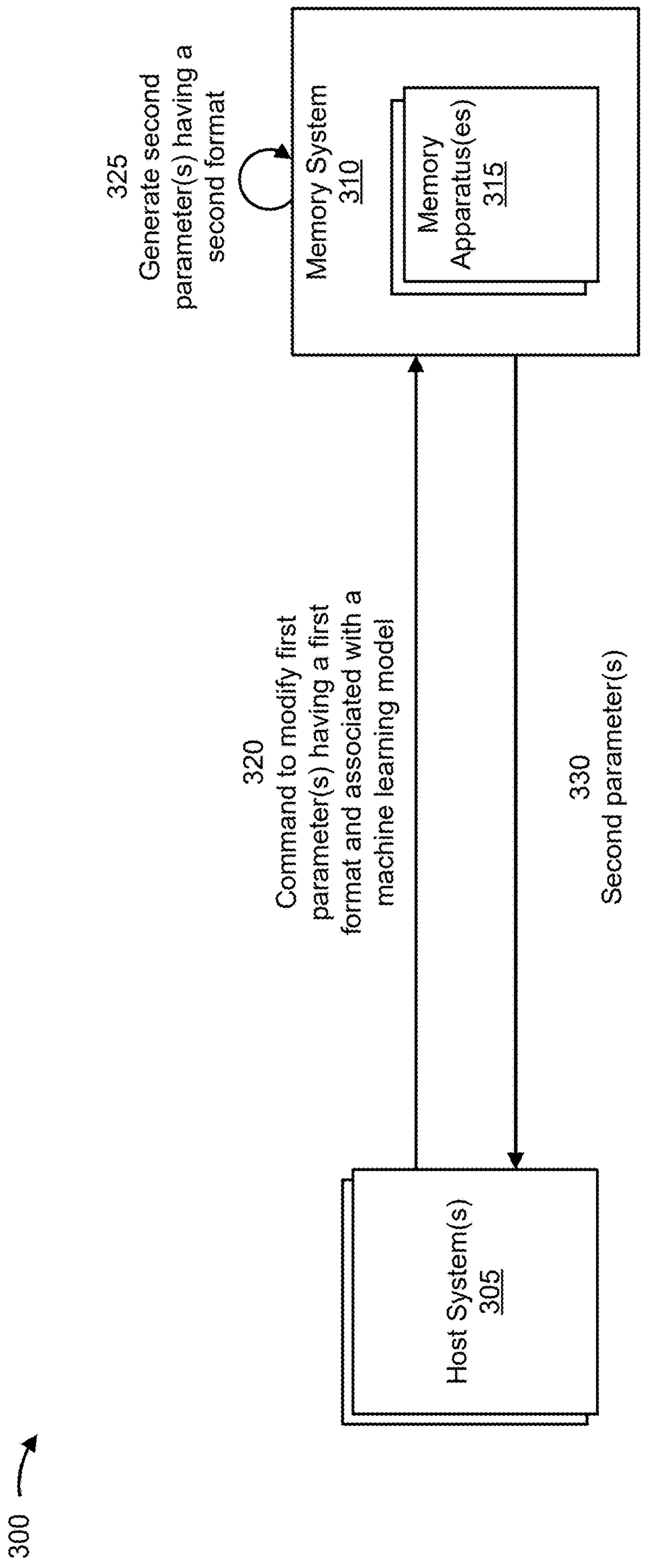
FIGS. 3A-3C are diagrams of an example of modifying machine learning parameters in memory systems.
Figure 3B:
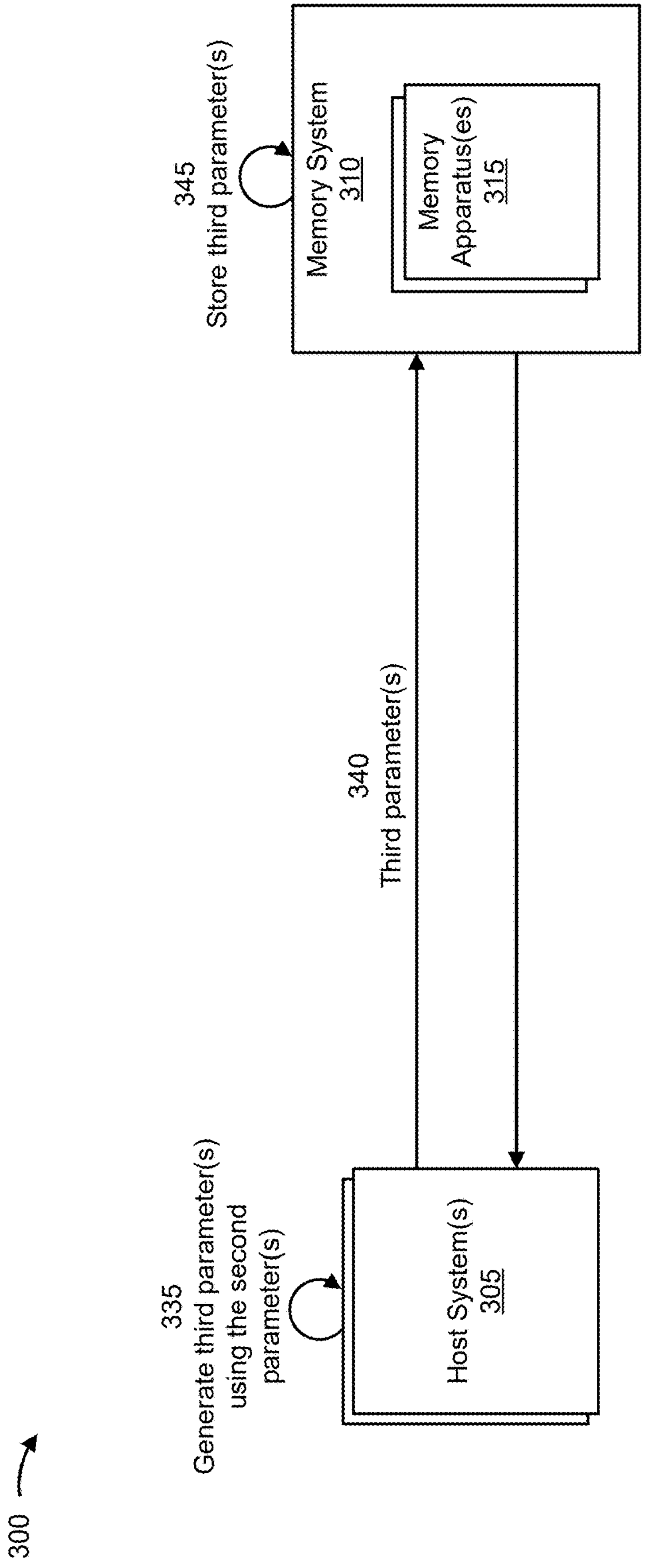
Figure 3C:
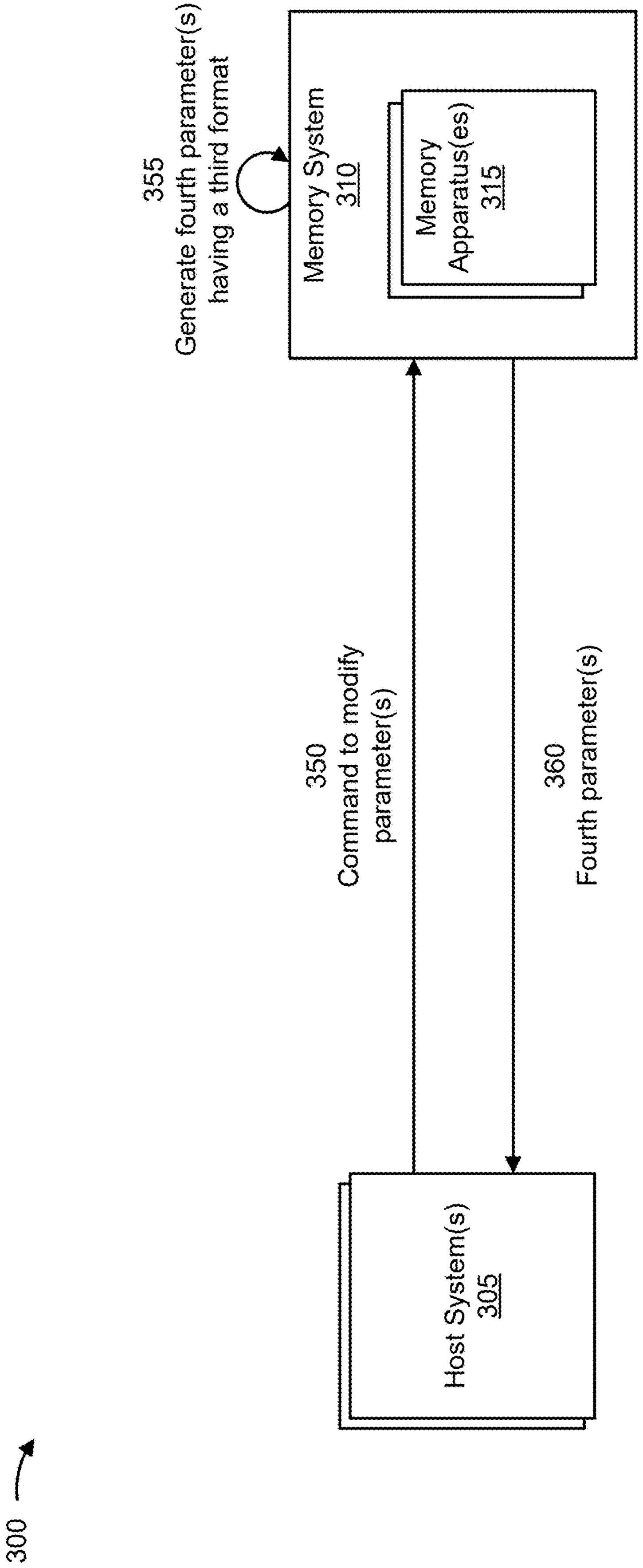

FIGS. 3A-3C are diagrams of an example 300 of modifying machine learning parameters in memory systems. The operations described in connection with FIGS. 3A through 3C may be performed by the memory system 110, the memory system 210, and/or one or more components of the memory system 110 and the memory system 210, such as the memory system controller 115, one or more memory devices 120, one or more local controllers 125, the CXL controller 215, one or more memory controllers 235, and/or one or more memory devices 220. Additionally, or alternatively, the operations described in connection with FIGS. 3A-3C may be performed by the system 100, the host system 105, one or more host systems 205, one or more components of the host system 105 (e.g., the host processor 150), the host interface 140, and/or the CXL interface 225.

In some examples, the memory system 210 may be an example of a near-memory computing (NMC) device. For example, the memory system 210 may include an NMC controller (e.g., the CXL controller 215) that is located physically near one or more memory arrays, such as the memory devices 220. For example, NMC may be associated with performing one or more processing operations using data via a component (e.g., an NMC device) that is physically located near a location in which the data is stored. For example, the NMC device and the memory device(s) 220 may be located on the same chip, the same SoC, and/or in the same processing system, among other examples. NMC may also be referred to as near-data computing. An NMC device may enable a host system 205 to offload processing tasks to the memory system 210, which may use an NMC device to perform the processing tasks locally before returning associated output data to the host system 205. Such NMC devices may include one or more processors, such as CPUs, GPUs, and/or accelerators that may apply quantization functions to machine learning model parameters. Because such NMC devices may be configured to process multiple parameters concurrently (e.g., using multi-threading or other parallel processing techniques), using NMC devices to perform quantization may improve performance by decreasing the time used to apply the quantization functions. Further, because NMC devices may be located physically near the memory devices 220, signaling between the memory devices 220 and NMC device(s) may be improved due to relatively short channel length (e.g., physical length of connections between the memory devices 220 and the NMC device(s)). For example, signal interference, signal degradation, and/or power consumption associated with long channels may be reduced.

The system 200 may include an adjustable quantity of host systems 205 and/or memory systems 210. For example, host system(s) 205 and/or memory system(s) 210 may be added to or removed from the system 200 to increase the processing capability of the system 200 (e.g., by including additional processors via the added host system(s) 205 and/or memory system(s) 210), to increase the memory capacity of the system 200 (e.g., via additional memory devices 220), and/or to increase bandwidth of the system 200 (e.g., by increasing the quantity of interfaces of the system 200).

In some examples, the host system(s) 205 may communicate with the memory system(s) 210 according to a CXL protocol. In some cases, the system 200 may include a switch (e.g., a memory switch, a storage switch) having a set of ports (e.g., channels, interfaces), where each port couples the switch with a respective host system 205 or memory system 210. The host systems 205 may share data stored to the memory system 210. For example, the host systems 205 and memory system(s) 210 may utilize a common addressing scheme that may allow multiple host systems 205 to access the same data in the memory system(s) 210.

As shown in FIGS. 3A-3C, the example 300 may include one or more host systems 305 and a memory system 310. The host system(s) 305 may be examples of the host system 105 and/or the host systems 205. The memory system 310 may be an example of a shared memory system that includes one or more memory apparatuses 315. The memory apparatus(es) may be or may include aspects of the memory system 110, the memory system 210, the memory system controller 115, one or more memory devices 120, one or more local controllers 125, the CXL controller 215, one or more memory controllers 235, and/or one or more memory devices 220.

In some examples, the host system(s) 305 and the memory system 310 may communicate in accordance with CXL protocol. For example, the host system(s) 305 may use the memory system 310 as memory subsystems and/or expansion modules of a shared memory system. A shared memory system may include one or more memory devices (e.g., memory devices 120 and/or memory devices 220) organized according to a virtual address space. The host system(s) 305 may access the one or more memory devices, such that data stored to the one or more memory devices may be shared between the host system(s) 305. In such examples, the host system(s) 305 may communicate with the memory system 310 via a switch (e.g., a memory switch, a storage switch) having a set of ports (e.g., channels, interfaces), where each port couples the switch to a respective host system 305 or memory system 310.

The host system(s) 305 and the memory system 310 may support quantizing parameters associated with a machine learning model at the memory system 310. For example, the host system(s) 305 may generate one or more base parameters (e.g., one or more first parameters) of the machine learning model, such as layer parameters of a neural network. The host system(s) 305 may generate the base parameter(s) as part of training the machine learning model, or after training the machine learning model (e.g., by performing post-training quantization). For example, the host system(s) 305 may generate the base parameter(s) by performing one or more training operations associated with the machine learning model on a set of training data based on a corresponding set of target data. The host system(s) may iteratively apply one or more training parameters to the training data (e.g., in accordance with an architecture of the model, such as by passing the training data through one or more layers of a neural network), and may adjust the training parameter(s) at each iteration to approximate the target data. The base parameter(s) may be the resulting parameter(s) after the one or more training operations. In some examples, the host system(s) 305 may adjust the base parameter(s) after performing the one or more training operations, such as by applying one or more quantization functions to the base parameter(s). Additionally, or alternatively, the base parameter(s) may correspond to other parameters associated with the machine learning model, such as pre-trained parameters obtained from a separate system training a machine learning model. In some examples, the base parameter(s) may be full precision or non-quantized parameter(s) of the machine learning model. In other examples, the base parameter(s) may be quantized versions of the parameter(s) of the machine learning model.

In some examples, the host system(s) 305 may store the base parameter(s) to the memory system 310. For example, the host system(s) 305 may provide, and the memory system 310 may obtain, a write command indicating that the memory apparatus(es) are to store the base parameter(s) to a location (e.g., an address range) of the memory system 310. In response to, based on, or otherwise associated with obtaining the write command, the memory system 310 may store the base parameter(s) to the indicated location. By the memory system 310 storing the base parameter(s), the memory system 310 may obtain the base parameter(s) from local memory (e.g., one or more memory devices of the memory apparatus(es) 315) as part of subsequent quantization operations. Accordingly, bandwidth associated with communicating the base parameter(s) may be reduced, which may improve performance of the host system(s) 305 and/or the memory system 310.

In some examples, the memory system 310 may store multiple copies of the base parameter(s). For example, the host system(s) 305 may indicate, via the write commands and/or other commands, that the memory system 310 is to store the base parameter(s) to multiple memory apparatuses 315. In such examples, the memory system 310 may store respective copies of the base parameter(s) to the indicated memory apparatuses 315. By writing multiple copies of the base parameter(s) to the memory system 310, the host system(s) 305 may improve the performance of multi-versioning. As described herein, "multi-versioning" refers to storing different formats (e.g., versions) of the base parameter(s) to different memory apparatuses 315. By writing multiple copies of the base parameter(s) to the memory system 310, each memory apparatus 315 may perform quantization (e.g., as described with reference to operations related to reference number 325) without retrieving the base parameter(s) from a separate memory apparatus 315. Accordingly, the memory system 310 may reduce bandwidth associated with communications between memory apparatuses 315 (e.g., inter-module communication), and thus improve system performance.

As shown in FIG. 3A and by reference number 320, the host system(s) may provide, and the memory system 310 may obtain, a quantization command. The quantization command may indicate that the memory system 310 is to modify (e.g., quantize) the base parameter(s) from a first format to a second format. In some implementations, the quantization command may include an indication (e.g., a flag or an identifier) of the first format and/or the second format. In some cases, the host system(s) 305 may provide the quantization command in accordance with CXL protocol. For example, quantization command may be a function call, a CXL command, and/or other commands supported by the CXL protocol.

The quantization command may indicate a source address range (e.g., one or more source addresses) and/or a destination address range (e.g., one or more destination addresses). The source address range may correspond to the location of the base parameter(s) in the memory apparatus(es). The destination address range may correspond to a location to which the memory system 310 is to store the modified base parameter(s) (e.g., the modified parameter(s)). In some examples, the source address range and the destination address range may be respective physical address ranges. For example, the source address range may correspond to one or more physical source addresses, such as the physical location of the base parameter(s) in the memory system 310. The destination address range may correspond to one or more physical destination addresses, such as the physical location to which the memory system 310 is to store the modified parameter(s). Additionally, or alternatively, the source address range and the destination address range may be respective virtual address ranges and/or respective logical address ranges. For example, the source address range may correspond to one or more virtual source addresses and the destination address range may correspond to one or more virtual destination addresses.

In such examples, the memory system 310 may map the virtual source address range to a source physical address range. Additionally, the memory system 310 may map the virtual destination address range to a physical destination address range. The memory system 310 may map a virtual address to a physical address using a mapping between one or more virtual addresses and one or more physical addresses of the memory system 310. In some implementations, the memory system 310 may map the source address range and the virtual address range using an address translation service (ATS). As described herein, "ATS" refers to a protocol that supports a request for data from the memory system 310 and to the host system 305 that indicates a virtual address. Based on, in response to, or otherwise associated with obtaining the request, the host system 305 may provide, and the memory system 310 may obtain, a physical address corresponding to the virtual address. The memory system 310 may store the mapping to a buffer, such as a translation lookaside buffer (TLB).

In some implementations, the host system(s) 305 may request the memory system 310 to modify the base parameter(s) to multiple formats. For example, the host system(s) 305 may provide multiple quantization commands to the memory system 310, where each quantization command indicates a different format. Alternatively, the host system(s) 305 may provide a single quantization command that indicates that the memory system 310 is to modify the base parameter(s) to multiple formats.

In such implementations, the memory system 310 may prioritize the quantization command(s). For example, if the memory system 310 obtains a first quantization command and subsequently receives a second quantization command, then the memory system 310 may prioritize performing the first quantization command before performing the second quantization command (e.g., the memory system 310 may perform quantization commands on a first-come first-serve basis).

Alternatively, the memory system 310 may prioritize quantization command(s) based on a priority metric indicated by the quantization commands. For example, a priority metric may indicate a duration between the host system(s) 305 providing the quantization command and the memory system 310 executing the prioritization command (e.g., the priority metric may be a requested latency associated with the prioritization command). In some examples, the host system(s) 305 may select or determine a priority metric for the quantization command. For example, the host system(s) 305 may obtain one or more user inputs indicating a priority metric associated with a given format. The host system(s) 305 may indicate the priority metric via the quantization command.

By way of example, the memory system 310 may obtain a first quantization command indicating a first priority metric and a second quantization command indicating a second priority metric. In such examples, the memory system 310 may compare the first priority metric to the second priority metric. If the first priority metric and the second priority metric indicate that the first quantization command is of a higher priority than the second quantization command (e.g., by the first priority metric indicating a lower requested latency than the second priority metric), then the memory system 310 may prioritize performing the first quantization command before performing the second quantization command. Alternatively, the memory system 310 may obtain a single quantization command indicating multiple formats and respective priority metrics. In such examples, the memory system 310 may prioritize modifying the base parameter(s) to the format corresponding to the highest priority metric (e.g., the lowest requested latency) of the respective priority metrics. By prioritizing the quantization commands, the memory system 310 may perform the quantization commands while satisfying the requested latency of the quantization commands. Accordingly, the memory system 310 may generate multiple formats (e.g., multiple versions) of the base parameter(s) in the order indicated by the host system(s), which may improve the ability of the host system(s) to efficiently schedule quantization operations.

As shown by reference number 325, the memory system 310 may generate the modified parameter(s) (e.g., one or more second parameters) based on, in response to, or otherwise associated with obtaining the quantization command(s). For example, the memory system 310 may retrieve the base parameter(s) (e.g., from the source address range) and provide the base parameter(s) to one or more processors (e.g., an NMC device or controller) of the memory apparatus(es), such as one or more embedded GPUs or other processing circuitry of the memory system 310. The memory system 310 may, using the processor(s), apply one or more quantization functions to the base parameter(s) to obtain the modified parameter(s) having the second format.

By way of example, a quantization function may include performing one or more operations on each of the base parameter(s). For example, a quantization function may include modifying a base parameter by subtracting a first offset (e.g., subtracting a first value) from the base parameter to obtain a first intermediate parameter. The quantization function may further include scaling the first intermediate parameter by multiplying the first intermediate parameter by a second value (e.g., a scaling factor) to obtain a second intermediate value. The quantization function may further include modifying the second intermediate value by adding a second offset (e.g., adding a third value) to the second intermediate value to obtain a modified parameter. By applying the quantization function to each of the base parameters, the memory system 310 may calculate the modified parameter(s). After generating the modified parameter(s), the memory system 310 may store the modified parameter(s) to the destination address range.

Although an example quantization function is described herein, the memory system 310 may apply other types of quantization functions to the base parameter(s) to generate the modified parameter(s). For example, the memory apparatus(es) may store one or more common quantization functions, such as in firmware or other non-volatile memory of the memory apparatus(es). In such cases, the memory apparatus(es) may select all, or a subset of, the basic quantization function(s) to apply to the base parameter(s). Additionally, or alternatively, the memory system 310 may obtain one or more programmed quantization functions. For example, the host system(s) 305 may provide the programmed quantization function(s), such as during configuration or other operation of the memory system 310. In some implementations, the host system(s) 305 may indicate which quantization functions are to be used, such as via the quantization command. Alternatively, the memory system 310 may select the quantization functions to be used without an explicit indication from the host system(s) 305 (for example, in accordance with a configuration of the memory system 310).

By quantizing the base parameter(s) at the memory system 310, performance of quantization may be improved. For example, because the memory system 310 may apply the quantization functions, rather than the host system(s) 305, processing load on the host system(s) 305 may be reduced, which may allow or improve the ability of the host system(s) 305 to perform other tasks. Further, because the memory system 310 may include processors such as GPUs and/or accelerators that may be configured to process multiple parameters concurrently (e.g., using multi-threading or other parallel processing techniques), performance may be improved by decreasing the time used to apply the quantization functions.

As shown by reference number 330, the memory system 310 may provide, and the host system(s) 305 may obtain, the modified parameter(s). For example, after storing the modified parameter(s), the memory apparatus(es) may provide an indication to the host system(s) 305 to indicate that the modified parameter(s) have been generated and stored. In some implementations, the memory apparatus(es) may set a value of a completion flag, such as by storing a logic "1" to the flag. The host system(s) 305 may periodically poll the value of the completion flag. The memory system 310 may provide the value of the flag to the host system(s) 305 (e.g., as a response to a polling request). Additionally, or alternatively, the memory system 310 may provide the indication by providing an interrupt to the host system(s) 305.

After obtaining the indication, the host system(s) may obtain the modified parameter(s). For example, the host system(s) 305 may issue one or more read commands to the memory system 310. The one or more read commands may indicate the destination address range. In response to, based on, or otherwise associated with obtaining the one or more read commands, the memory apparatus(es) may provide, and the host system(s) may obtain, the modified parameter(s).

As shown in FIG. 3B and by reference number 335, the host system(s) 305 may generate additional parameter(s) (e.g., third parameters) using the modified parameter(s). By way of example, the host system(s) 305 may execute the machine learning model using the modified parameter(s). For example, the host system(s) 305 may process one or more queries using the modified parameter(s) and may adjust the modified parameter(s) based on an output of the one or more queries. Additionally, or alternatively, the host system(s) 305 may perform one or more training operations using the modified parameter(s). For example, the host system(s) 305 may process a set of training data using the modified parameter(s) to obtain an accuracy score (e.g., based on comparing the output of the machine learning model to a target output associated with the training data). If the accuracy score does not satisfy a threshold, then the host system(s) 305 may determine to update the modified parameter(s). For example, the host system(s) 305 may scale or otherwise adjust the modified parameter(s) to obtain the additional parameter(s). As shown by reference number 340, the host system(s) 305 may provide, and the memory system 310 may obtain, one or more write commands for the additional parameter(s).

In some examples, the memory system 310 may generate the additional parameter(s). For example, the memory system 310 may, using a processor, such as an NMC device, a CPU, a GPU, and/or an accelerator, perform one or more training operations using the modified parameter(s) to obtain an accuracy score. If the accuracy score does not satisfy a threshold, then the memory system 310 may determine to update the modified parameter(s) (e.g., by scaling or otherwise adjusting the modified parameter(s)). By generating the additional parameter(s) at the memory system 310, rather than at the host system(s) 305, the memory system 310 may reduce the processing load of the host system(s) and thus improve system performance.

As shown by reference number 345, based on, in response to, or otherwise associated with obtaining the additional parameter(s), the memory system 310 may store the additional parameter(s) (for example, to a source address range indicated by the one or more write commands). Alternatively, the host system(s) 305 may provide, and the memory system 310 may obtain, a command to adjust the modified parameter(s) and/or the base parameter(s) stored at the memory system 310. For example, the host system(s) 305 may indicate, via the command, a scaling factor or other adjustment to be applied to the modified parameter(s) and/or the base parameter(s). In such examples, the memory system 310 may adjust the modified parameter(s) and/or the base parameter(s) based on the command. In such examples, because the memory system 310 may adjust the modified parameter(s), rather than the host system(s) 305, the memory system 310 may reduce the processing load of the host system(s) 305 and thus improve system performance.

Additionally, or alternatively, the host system(s) 305 may determine to repeat (e.g., iterate) aspects of the example 300 based on the accuracy score. For example, as shown in FIG. 3C and by reference number 350, the host system(s) 305 may provide, and the memory system 310 may obtain, a second quantization command to modify the base parameter(s) and/or the modified parameter(s). The second quantization command may indicate a different format (e.g., a third format) to which the base parameter(s) may be modified. In some examples, the host system(s) 305 may determine the third format based on the accuracy score. As shown by reference number 355, the memory system 310 may adjust the modified parameter(s) and/or the base parameter(s) to obtain additional parameter(s) (for example, in accordance with operations associated with reference number 325). As shown by reference number 360, the memory system 310 may provide, and the host system(s) 305 may obtain, the additional parameter(s) (for example, in accordance with operations associated with reference number 325).

As indicated above, FIGS. 3A through 3C are provided as examples. Other examples may differ from what is described with regard to FIGS. 3A through 3C.

Figure 4:
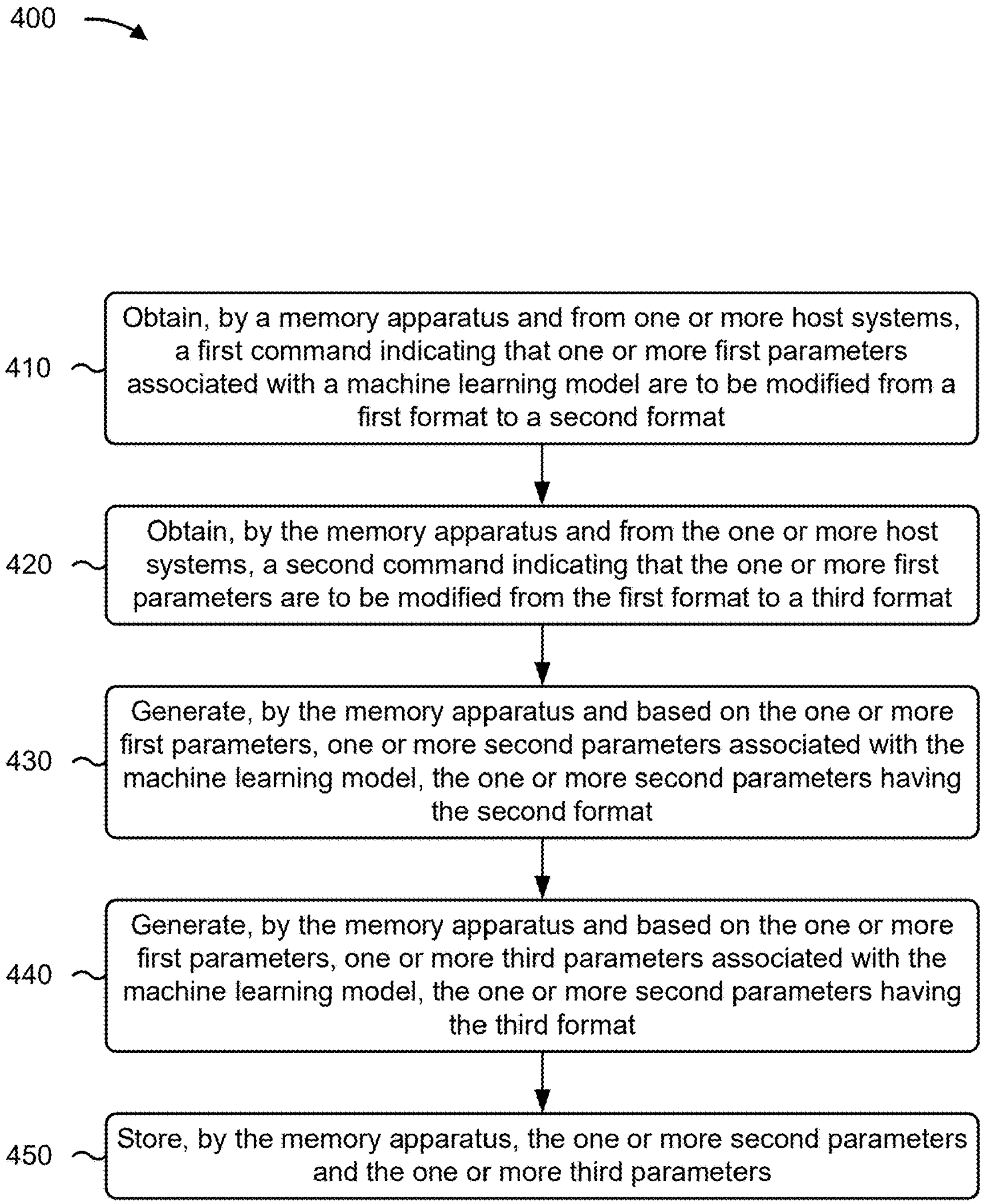
FIG. 4 is a flowchart of an example method associated with modifying machine learning parameters in memory systems.

FIG. 4 is a flowchart of an example method 400 associated with modifying machine learning parameters in memory systems. In some implementations, a memory apparatus (e.g., the memory system 110, the memory system 210, and or a memory system 310) may perform or may be configured to perform the method 400. In some implementations, another device or a group of devices separate from or including the memory apparatus (e.g., a host system 105, a host system 205, and/or a host system 305) may perform or may be configured to perform the method 400. Additionally, or alternatively, one or more components of the memory apparatus (e.g., the memory system controller 115, one or more memory devices 120, one or more local controllers 125, one or more memory interfaces 145, one or more volatile memory arrays 135, a CXL controller 215, and/or one or more memory devices 220) may perform or may be configured to perform the method 400. Thus, means for performing the method 400 may include the memory apparatus and/or one or more components of the memory apparatus. Additionally, or alternatively, a non-transitory computer-readable medium may store one or more instructions that, when executed by the memory apparatus, cause the memory apparatus to perform the method 400.

As shown in FIG. 4, the method 400 may include obtaining, from one or more host systems, a first command indicating that one or more first parameters associated with a full precision dataset are to be modified from a first format to a second format (block 410). As further shown in FIG. 4, the method 400 may include obtaining, from the one or more host systems, a second command indicating that the one or more first parameters are to be modified from the first format to a third format (block 420). As further shown in FIG. 4, the method 400 may include generating, based on the one or more first parameters, one or more second parameters associated with the full precision dataset, the one or more second parameters having the second format (block 430). As further shown in FIG. 4, the method 400 may include generating, based on the one or more first parameters, one or more third parameters associated with the full precision dataset, the one or more second parameters having the third format (block 440). As further shown in FIG. 4, the method 400 may include storing the one or more second parameters and the one or more third parameters (block 450).

The method 400 may include additional aspects, such as any single aspect or any combination of aspects described below and/or described in connection with one or more other methods or operations described elsewhere herein.

In a first aspect, the method 400 includes prioritizing generating the one or more second parameters over generating the one or more third parameters based on obtaining the first command before obtaining the second command.

In a second aspect, alone or in combination with the first aspect, the method 400 includes prioritizing generating the one or more second parameters over generating the one or more third parameters based on a first priority metric indicated by the first command and based on a second priority metric indicated by the second command.

In a third aspect, alone or in combination with one or more of the first and second aspects, the method 400 includes receiving the one or more first parameters from the one or more host systems, and storing the one or more first parameters to the memory apparatus.

In a fourth aspect, alone or in combination with one or more of the first through third aspects, the method 400 includes providing, based on storing the one or more second parameters, the one or more second parameters to the one or more host systems, and providing, based on storing the one or more third parameters, the one or more third parameters to the one or more host systems.

Although FIG. 4 shows example blocks of a method 400, in some implementations, the method 400 may include additional blocks, fewer blocks, different blocks, or differently arranged blocks than those depicted in FIG. 4. Additionally, or alternatively, two or more of the blocks of the method 400 may be performed in parallel. The method 400 is an example of one method that may be performed by one or more devices described herein. These one or more devices may perform or may be configured to perform one or more other methods based on operations described herein.

Figure 5:
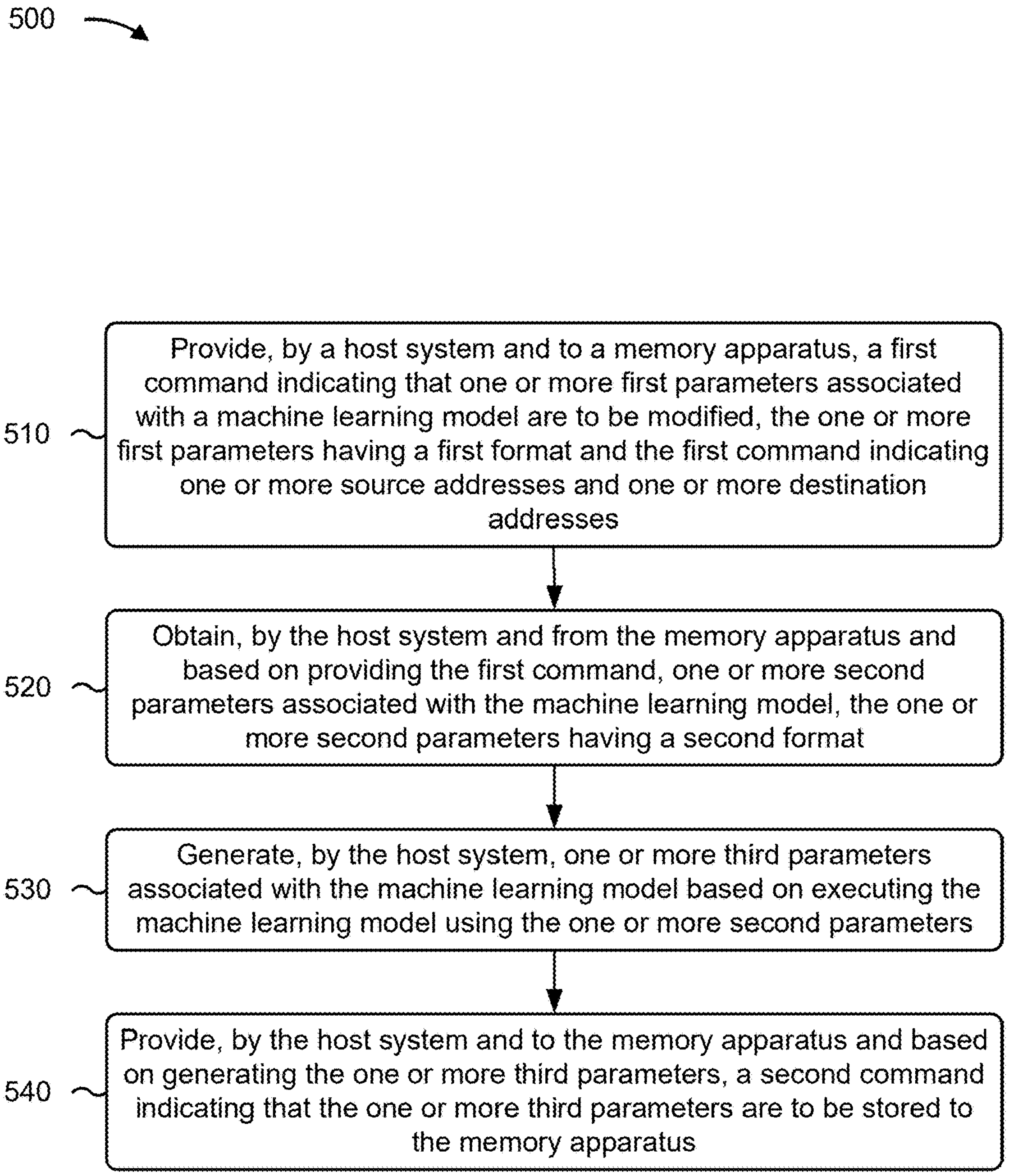
FIG. 5 is a flowchart of an example method associated with modifying machine learning parameters in memory systems.

FIG. 5 is a flowchart of an example method 500 associated with modifying machine learning parameters in memory systems. In some implementations, a host system (e.g., the host system 105, the host system 205, and/or the host system 305) may perform or may be configured to perform the method 500. In some implementations, another device or a group of devices separate from or including the host system (e.g., the memory system 110, the memory system 210, and/or the memory system 310) may perform or may be configured to perform the method 500. Additionally, or alternatively, one or more components of the host system (e.g., the host processor 150 and/or the host interface 140) may perform or may be configured to perform the method 500. Thus, means for performing the method 500 may include the host system and/or one or more components of the host system. Additionally, or alternatively, a non-transitory computer-readable medium may store one or more instructions that, when executed by the host system, cause the host system to perform the method 500.

As shown in FIG. 5, the method 500 may include providing, to a memory apparatus, a first command indicating that one or more first parameters associated with a full precision dataset are to be modified, the one or more first parameters having a first format and the first command indicating one or more source addresses and one or more destination addresses (block 510). As further shown in FIG. 5, the method 500 may include obtaining, from the memory apparatus and based on providing the first command, one or more second parameters associated with the full precision dataset, the one or more second parameters having a second format (block 520). As further shown in FIG. 5, the method 500 may include generating one or more third parameters associated with the full precision dataset based on executing the full precision dataset using the one or more second parameters (block 530). As further shown in FIG. 5, the method 500 may include providing, to the memory apparatus and based on generating the one or more third parameters, a second command indicating that the one or more third parameters are to be stored to the memory apparatus (block 540).

The method 500 may include additional aspects, such as any single aspect or any combination of aspects described below and/or described in connection with one or more other methods or operations described elsewhere herein.

In a first aspect, the method 500 includes providing, to the memory apparatus, a third command indicating that the one or more third parameters are to be stored, and obtaining, from the memory apparatus and based on proving the third command, one or more fourth parameters associated with the full precision dataset, the one or more fourth parameters having a third format.

In a second aspect, alone or in combination with the first aspect, the first command indicates a first quantization function associated with generating the one or more second parameters and the third command indicates a second quantization function associated with generating the one or more fourth parameters, the first quantization function different than the second quantization function.

Although FIG. 5 shows example blocks of a method 500, in some implementations, the method 500 may include additional blocks, fewer blocks, different blocks, or differently arranged blocks than those depicted in FIG. 5. Additionally, or alternatively, two or more of the blocks of the method 500 may be performed in parallel. The method 500 is an example of one method that may be performed by one or more devices described herein. These one or more devices may perform or may be configured to perform one or more other methods based on operations described herein.

In some implementations, a system includes one or more memory devices; and a memory module controller including: a memory subsystem interface; and a controller configured to: obtain, from one or more host systems, a command indicating that one or more first parameters associated with a full precision dataset are to be modified, the command indicating one or more source addresses and one or more destination addresses; obtain, based on obtaining the command, the one or more first parameters from the one or more source addresses, the one or more first parameters having a first format; generate, based on the one or more first parameters, one or more second parameters associated with the full precision dataset, the one or more second parameters having a second format; and store the one or more second parameters to the one or more destination addresses.

In some implementations, a host system includes one or more controllers configured to: provide, to a memory apparatus, a first command indicating that the memory apparatus is to modify one or more first parameters associated with a full precision dataset, the one or more first parameters having a first format and the first command indicating one or more source addresses and one or more destination addresses; obtain, from the memory apparatus and based on providing the first command, one or more second parameters associated with the full precision dataset, the one or more second parameters having a second format; generate one or more third parameters associated with the full precision dataset based on executing the full precision dataset using the one or more second parameters; and provide, to the memory apparatus and based on generating the one or more third parameters, a second command indicating that the one or more third parameters are to be stored to the memory apparatus.

In some implementations, a system includes a host system; a memory apparatus; a host interface between the host system and the memory apparatus; and one or more controllers configured to: communicate, via the host interface and to the memory apparatus, a first command indicating that one or more first parameters associated with a full precision dataset are to be modified, the one or more first parameters having a first format and the first command indicating one or more source addresses and one or more destination addresses; communicate, via the host interface and to the host system and based on communicating the first command, one or more second parameters associated with the full precision dataset, the one or more second parameters having a second format; and communicate, via the host interface and to the memory apparatus, a second command indicating that one or more third parameters are to be stored to the memory apparatus, the one or more third parameters based on executing the full precision dataset using the one or more second parameters.

In some implementations, a method includes obtaining, by a memory apparatus and from one or more host systems, a first command indicating that one or more first parameters associated with a full precision dataset are to be modified from a first format to a second format; obtaining, by the memory apparatus and from the one or more host systems, a second command indicating that the one or more first parameters are to be modified from the first format to a third format; generating, by the memory apparatus and based on the one or more first parameters, one or more second parameters associated with the full precision dataset, the one or more second parameters having the second format; generating, by the memory apparatus and based on the one or more first parameters, one or more third parameters associated with the full precision dataset, the one or more second parameters having the third format; and storing, by the memory apparatus, the one or more second parameters and the one or more third parameters.

In some implementations, a method includes providing, by a host system and to a memory apparatus, a first command indicating that one or more first parameters associated with a full precision dataset are to be modified, the one or more first parameters having a first format and the first command indicating one or more source addresses and one or more destination addresses; obtaining, by the host system and from the memory apparatus and based on providing the first command, one or more second parameters associated with the full precision dataset, the one or more second parameters having a second format; generating, by the host system, one or more third parameters associated with the full precision dataset based on executing the full precision dataset using the one or more second parameters; and providing, by the host system and to the memory apparatus and based on generating the one or more third parameters, a second command indicating that the one or more third parameters are to be stored to the memory apparatus.

In some implementations, an apparatus includes means for obtaining, from one or more host systems, a first command indicating that one or more first parameters associated with a full precision dataset are to be modified from a first format to a second format; means for obtaining, from the one or more host systems, a second command indicating that the one or more first parameters are to be modified from the first format to a third format; means for generating, based on the one or more first parameters, one or more second parameters associated with the full precision dataset, the one or more second parameters having the second format; means for generating, based on the one or more first parameters, one or more third parameters associated with the full precision dataset, the one or more second parameters having the third format; and means for storing the one or more second parameters and the one or more third parameters.

In some implementations, an apparatus includes means for providing, to a memory apparatus, a first command indicating that one or more first parameters associated with a full precision dataset are to be modified, the one or more first parameters having a first format and the first command indicating one or more source addresses and one or more destination addresses; means for obtaining, from the memory apparatus and based on providing the first command, one or more second parameters associated with the full precision dataset, the one or more second parameters having a second format; means for generating one or more third parameters associated with the full precision dataset based on executing the full precision dataset using the one or more second parameters; and means for providing, to the memory apparatus and based on generating the one or more third parameters, a second command indicating that the one or more third parameters are to be stored to the memory apparatus.

The foregoing disclosure provides illustration and description but is not intended to be exhaustive or to limit the implementations to the precise forms disclosed. Modifications and variations may be made in light of the above disclosure or may be acquired from practice of the implementations described herein.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

When "a component" or "one or more components" (or another element, such as "a controller" or "one or more controllers") is described or claimed (within a single claim or across multiple claims) as performing multiple operations or being configured to perform multiple operations, this language is intended to broadly cover a variety of architectures and environments. For example, unless explicitly claimed otherwise (e.g., via the use of "first component" and "second component" or other language that differentiates components in the claims), this language is intended to cover a single component performing or being configured to perform all of the operations, a group of components collectively performing or being configured to perform all of the operations, a first component performing or being configured to perform a first operation and a second component performing or being configured to perform a second operation, or any combination of components performing or being configured to perform the operations. For example, when a claim has the form "one or more components configured to: perform X; perform Y; and perform Z," that claim should be interpreted to mean "one or more components configured to perform X; one or more (possibly different) components configured to perform Y; and one or more (also possibly different) components configured to perform Z."

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A system, comprising:

one or more memory devices; and a memory module controller comprising:

a memory subsystem interface; and a controller configured to:

obtain, from one or more host systems, a command indicating that one or more first parameters associated with a full precision dataset are to be modified from a first format to a second format, the command indicating one or more source addresses and one or more destination addresses, wherein the command includes an indication of the first format and an indication of the second format;

obtain, based on obtaining the command, the one or more first parameters from the one or more source addresses, the one or more first parameters having the first format;

generate, based on the one or more first parameters, one or more second parameters associated with the full precision dataset, the one or more second parameters having the second format, wherein, to generate the one or more second parameters, the controller is configured to:

modify the one or more first parameters according to a first offset to generate one or more third parameters;

scale the one or more third parameters to generate one or more fourth parameters; and modify the one or more fourth parameters according to a second offset to generate the one or more second parameters; and store the one or more second parameters to the one or more destination addresses.

2. The system of claim 1, wherein the controller is further configured to:

receive the one or more first parameters from the one or more host systems; and store the one or more first parameters to the one or more memory devices, wherein obtaining the command indicating that the one or more first parameters are to be modified is based on storing the one or more first parameters.

3. The system of claim 1, wherein the controller is further configured to:

provide, based on storing the one or more second parameters, the one or more second parameters to the one or more host systems.

4. The system of claim 3, wherein, to provide the one or more second parameters to the one or more host systems, the controller is configured to:

set a value of a completion flag based on storing the one or more second parameters to the one or more destination addresses;

obtain, from the one or more host systems and based on setting the value of the completion flag, one or more read commands for the one or more destination addresses; and transmit, based on obtaining the one or more read commands, the one or more second parameters from the one or more destination addresses to the one or more host systems.

5. The system of claim 3, wherein, to provide the one or more second parameters to the one or more host systems, the controller is configured to:

transmit, to the one or more host systems and based on storing the one or more second parameters to the one or more destination addresses, an indication that the one or more second parameters are generated;

obtain, from the one or more host systems and based on transmitting the indication, one or more read commands for the one or more destination addresses; and transmit, based on obtaining the one or more read commands, the one or more second parameters from the one or more destination addresses to the one or more host systems.

6. The system of claim 1, wherein the one or more source addresses comprise one or more physical source addresses and the one or more destination addresses comprise one or more physical destination addresses.

7. The system of claim 1, wherein the one or more source addresses comprise one or more virtual source addresses and the one or more destination addresses comprise one or more virtual destination addresses, and wherein the controller is further configured to:

map the one or more virtual source addresses to one or more physical source addresses based on a mapping between one or more virtual addresses and one or more physical addresses.

8. The system of claim 7, wherein the controller is further configured to:

store the mapping to a buffer of the controller.

9. The system of claim 1, wherein, to generate the one or more second parameters, the controller is further configured to:

apply one or more quantization functions to the one or more first parameters to calculate the one or more second parameters.

10. The system of claim 9, wherein the controller is further configured to:

obtain, from the one or more host systems, the one or more quantization functions.

11. The system of claim 9, wherein the command indicates the one or more quantization functions.

12. The system of claim 1, wherein the controller is further configured to:

generate one or more fifth parameters associated with the full precision dataset based on executing the full precision dataset using the one or more second parameters; and store, based on generating the one or more fifth parameters, the one or more fifth parameters to the one or more memory devices.

13. The system of claim 1, wherein the first format corresponds to a first quantity of bits for a first parameter of the one or more first parameters and the second format corresponds to a second quantity of bits for a second parameter of the one or more second parameters, the second quantity of bits less than the first quantity of bits.

14. The system of claim 1, wherein the controller is a near-memory computing (NMC) controller.

15. The system of claim 1, wherein the one or more first parameters and the one or more second parameters are neural network parameters associated with the full precision dataset.

16. A method, comprising:

obtaining, by a memory apparatus and from one or more host systems, a first command indicating that one or more first parameters associated with a full precision dataset are to be modified from a first format to a second format, wherein the first command includes an indication of the first format and an indication of the second format;

obtaining, by the memory apparatus and from the one or more host systems, a second command indicating that the one or more first parameters are to be modified from the first format to a third format;

generating, by the memory apparatus and based on the one or more first parameters, one or more second parameters associated with the full precision dataset, the one or more second parameters having the second format, wherein generating the one or more second parameters comprises:

modifying the one or more first parameters according to a first offset to generate one or more fourth parameters;

scaling the one or more fourth parameters to generate one or more fifth parameters; and modifying the one or more fifth parameters according to a second offset to generate the one or more second parameters;

generating, by the memory apparatus and based on the one or more first parameters, one or more third parameters associated with the full precision dataset, the one or more third parameters having the third format; and storing, by the memory apparatus, the one or more second parameters and the one or more third parameters.

17. The method of claim 16, further comprising:

prioritizing generating the one or more second parameters over generating the one or more third parameters based on obtaining the first command before obtaining the second command.

18. The method of claim 16, further comprising:

prioritizing generating the one or more second parameters over generating the one or more third parameters based on a first priority metric indicated by the first command and based on a second priority metric indicated by the second command.

19. The method of claim 16, further comprising:

receiving the one or more first parameters from the one or more host systems; and storing the one or more first parameters to the memory apparatus.

20. The method of claim 16, further comprising:

providing, based on storing the one or more second parameters, the one or more second parameters to the one or more host systems; and providing, based on storing the one or more third parameters, the one or more third parameters to the one or more host systems.

21. A method, comprising:

obtaining, by a memory apparatus and from one or more host systems, a command indicating that one or more first parameters associated with a full precision dataset are to be modified from a first format to a second format, the command indicating one or more source addresses and one or more destination addresses, wherein the command includes an indication of the first format and an indication of the second format;

obtaining, by the memory apparatus and based on obtaining the command, the one or more first parameters from the one or more source addresses, the one or more first parameters having the first format;

generating, by the memory apparatus and based on the one or more first parameters, one or more second parameters associated with the full precision dataset, the one or more second parameters having the second format, wherein generating the one or more second parameters comprises:

modifying the one or more first parameters according to a first offset to generate one or more third parameters;

scaling the one or more third parameters to generate one or more fourth parameters; and modifying the one or more fourth parameters according to a second offset to generate the one or more second parameters; and storing, by the memory apparatus, the one or more second parameters to the one or more destination addresses.

22. The method of claim 21, further comprising:

receiving the one or more first parameters from the one or more host systems; and storing the one or more first parameters to the memory apparatus, wherein obtaining the command indicating that the one or more first parameters are to be modified is based on storing the one or more first parameters.

23. The method of claim 21, further comprising:

providing, based on storing the one or more second parameters, the one or more second parameters to the one or more host systems.

24. The method of claim 23, wherein providing the one or more second parameters to the one or more host systems comprises:

setting a value of a completion flag based on storing the one or more second parameters to the one or more destination addresses;

obtaining, from the one or more host systems and based on setting the value of the completion flag, one or more read commands for the one or more destination addresses; and transmitting, based on obtaining the one or more read commands, the one or more second parameters from the one or more destination addresses to the one or more host systems.

25. A system, comprising:

one or more memory devices; and a memory module controller comprising:

a memory subsystem interface; and a controller configured to:

obtain, from one or more host systems, a first command indicating that one or more first parameters associated with a full precision dataset are to be modified from a first format to a second format, wherein the first command includes an indication of the first format and an indication of the second format;

obtain, from the one or more host systems, a second command indicating that the one or more first parameters are to be modified from the first format to a third format;

generate, based on the one or more first parameters, one or more second parameters associated with the full precision dataset, the one or more second parameters having the second format, wherein, to generate the one or more second parameters, the controller is configured to:

modify the one or more first parameters according to a first offset to generate one or more fourth parameters;

scale the one or more fourth parameters to generate one or more fifth parameters; and modify the one or more fifth parameters according to a second offset to generate the one or more second parameters;

generate, based on the one or more first parameters, one or more third parameters associated with the full precision dataset, the one or more third parameters having the third format; and store the one or more second parameters and the one or more third parameters.

26. The system of claim 25, wherein the controller is further configured to:

prioritize generating the one or more second parameters over generating the one or more third parameters based on obtaining the first command before obtaining the second command.

27. The system of claim 25, wherein the controller is further configured to:

prioritize generating the one or more second parameters over generating the one or more third parameters based on a first priority metric indicated by the first command and based on a second priority metric indicated by the second command.

28. The system of claim 25, wherein the controller is further configured to:

receive the one or more first parameters from the one or more host systems; and store the one or more first parameters to the one or more memory devices.

29. An apparatus, comprising:

means for obtaining, by a memory apparatus and from one or more host systems, a command indicating that one or more first parameters associated with a full precision dataset are to be modified from a first format to a second format, the command indicating one or more source addresses and one or more destination addresses, wherein the command includes an indication of the first format and an indication of the second format;

means for obtaining, by the memory apparatus and based on obtaining the command, the one or more first parameters from the one or more source addresses, the one or more first parameters having the first format;

means for generating, by the memory apparatus and based on the one or more first parameters, one or more second parameters associated with the full precision dataset, the one or more second parameters having the second format, wherein the means for generating the one or more second parameters comprise:

means for modifying the one or more first parameters according to a first offset to generate one or more third parameters;

means for scaling the one or more third parameters to generate one or more fourth parameters; and means for modifying the one or more fourth parameters according to a second offset to generate the one or more second parameters; and means for storing, by the memory apparatus, the one or more second parameters to the one or more destination addresses.

30. The apparatus of claim 29, further comprising:

means for receiving the one or more first parameters from the one or more host systems; and means for storing the one or more first parameters to the memory apparatus, wherein obtaining the command indicating that the one or more first parameters are to be modified is based on storing the one or more first parameters.

31. The apparatus of claim 29, further comprising:

means for providing, based on storing the one or more second parameters, the one or more second parameters to the one or more host systems.

32. The apparatus of claim 31, wherein the means for providing the one or more second parameters to the one or more host systems comprise:

means for setting a value of a completion flag based on storing the one or more second parameters to the one or more destination addresses;

means for obtaining, from the one or more host systems and based on setting the value of the completion flag, one or more read commands for the one or more destination addresses; and means for transmitting, based on obtaining the one or more read commands, the one or more second parameters from the one or more destination addresses to the one or more host systems.

33. The apparatus of claim 29, wherein the one or more source addresses comprise one or more physical source addresses and the one or more destination addresses comprise one or more physical destination addresses.

34. The apparatus of claim 29, wherein the first format corresponds to a first quantity of bits for a first parameter of the one or more first parameters and the second format corresponds to a second quantity of bits for a second parameter of the one or more second parameters, the second quantity of bits less than the first quantity of bits.

* * * * *